(12) United States Patent
Lee

(10) Patent No.: US 10,554,799 B2
(45) Date of Patent: Feb. 4, 2020

(54) PORTABLE DEVICE HOLDER AND SUPPORT FOR CONTAINING SAME

(71) Applicant: REARTH, INC., Bucheon-si, Gyeonggi-do (KR)

(72) Inventor: Jang Woo Lee, Suwon-si (KR)

(73) Assignee: REARTH, INC., Bucheon-si, Gyeonggi-Do (KR)

( * ) Notice: Subject to any disclaimer, the term of this patent is extended or adjusted under 35 U.S.C. 154(b) by 0 days.

(21) Appl. No.: 16/316,907

(22) PCT Filed: Jul. 12, 2017

(86) PCT No.: PCT/KR2017/007478
§ 371 (c)(1),
(2) Date: Feb. 12, 2019

(87) PCT Pub. No.: WO2018/012884
PCT Pub. Date: Jan. 18, 2018

(65) Prior Publication Data
US 2019/0230205 A1    Jul. 25, 2019

(30) Foreign Application Priority Data

Jul. 13, 2016 (KR) .................. 20-2016-0004047 U
Mar. 13, 2017 (KR) .................. 20-2017-0001174 U

(51) Int. Cl.
*H04M 1/04* (2006.01)
(52) U.S. Cl.
CPC .................. *H04M 1/04* (2013.01)

(58) Field of Classification Search
CPC ........................................ H04M 1/04
USPC ........................................ 455/575.1, 575.8
See application file for complete search history.

(56) References Cited

U.S. PATENT DOCUMENTS

2016/0039357 A1    2/2016  Jang

FOREIGN PATENT DOCUMENTS

| KR | 10-2004-0089200 A | 10/2004 |
| KR | 10-2012-0129450 A | 11/2012 |
| KR | 10-2013-0032075 A | 4/2013 |
| KR | 10-2013-0142853 A | 12/2013 |
| KR | 10-2014-0123837 A | 10/2014 |
| KR | 10-2015-0033835 A | 4/2015 |
| KR | 10-1557968 B1 | 10/2015 |

*Primary Examiner* — Joel Ajayi
(74) *Attorney, Agent, or Firm* — Novick, Kim & Lee, PLLC; Jae Youn Kim

(57) ABSTRACT

A portable device holder includes a base to be fixed to a portable device, a housing rotatably mounted on the base, and an elastic handle rotatably fixed to both side surfaces of the housing and configured to be elastically locked at a predetermined rotation position. Handle end connectors are formed on both side surfaces of the housing so as to protrude in a direction perpendicular to a rotation axis of the housing. Housing couplers rotatably coupled to the handle end connectors are provided at both ends of the elastic handle. The base may be provided with a gel pad for attaching a portable electronic device. The base may be integrally formed with a case (mobile phone case) for mounting a portable electronic device.

6 Claims, 9 Drawing Sheets

PORTABLE DEVICE HOLDER AND SUPPORT FOR CONTAINING SAME

TECHNICAL FIELD

The present invention relates to a portable device holder and a holder receiving support for receiving and supporting the holder. More particularly, the present invention relates to a holder capable of holding various portable products and a holder receiving support having a structure capable of easily mounting and demounting the holder.

BACKGROUND ART

When using a portable electronic device such as a mobile phone or a tablet, the portable electronic device is held by one hand. If the portable electronic device is missed by the hand during the use of the portable electronic device with one hand, there is a risk that the electronic device is damaged.

Various types of holders have been invented which can prevent a portable electronic device from being dropped from the hand and damaged when the portable electronic device is held and used in one hand. Korean Patent No. 10-1557968 (entitled "mobile phone cradle using hanger grip") discloses a holder (hanger grip) that can be attached to a mobile phone or a case of a mobile phone and a device (cradle) for supporting the holder. As shown in FIG. 1, the holder disclosed in the above patent includes a base 20 for attaching a mobile phone 80 and a ring 40 rotatably connected to the base 20. The base 20 is provided with a permanent magnet. A thin steel plate to be attached to the permanent magnet of the base 20 is bonded to the mobile phone by an adhesive so that the holder can be attached or detached. The ring 40 is used by fitting the finger of a user into the ring 40 to prevent the mobile phone from falling out of the hand during use. The ring 40 is connected to a rotary part 30 that elastically supports the ring 40.

FIG. 2 shows an embodiment in which a holder is attached to a cradle. The mobile phone cradle and the holder (hanger grip) of the embodiment shown in FIG. 2 can be detachably attached using a permanent magnet. The holder is provided with a permanent magnet, and the cradle is provided with a steel plate for attaching the permanent magnet.

As described above, a permanent magnet is used to easily attach and detach the holder to an electronic device such as a mobile phone or the like. However, the attachment using the permanent magnet is not robust. There is a risk that the electronic device attached to the holder is dropped. Furthermore, there is a concern that the magnetic field of the permanent magnet may deteriorate the performance of the portable electronic device. In addition, the permanent magnet is expensive, which increases the manufacturing cost.

SUMMARY

It is an object of the present invention to provide a holder of a novel structure which can firmly support a portable electronic device without using a permanent magnet to prevent the portable electronic device from falling off and which can be used with ease. Another object of the present invention to provide a holder receiving support having a novel structure which can easily attach and detach a holder.

The holder may be used alone. Furthermore, the holder may be used in a pair with an attached holder receiving support. The attached holder receiving support is installed at a joint terminal of a device such as a mobile phone cradle or the like so that the holder receiving support can be easily attach and detach the holder and can firmly support the holder attached thereto.

According to one aspect of the present invention, there is provided a portable device holder. The portable device holder includes a base to be fixed to a portable device, a housing rotatably mounted on the base, and an elastic handle rotatably fixed to both side surfaces of the housing and configured to be elastically locked at a predetermined rotation position. Handle end connectors are formed on both side surfaces of the housing so as to protrude in a direction perpendicular to a rotation axis of the housing. Housing couplers rotatably coupled to the handle end connectors are provided at both ends of the elastic handle. The base may be provided with a gel pad for attaching a portable electronic device. The base may be integrally formed with a case (mobile phone case) for mounting a portable electronic device.

In the portable device holder according to the present invention, each of the handle end connectors may have a cylindrical shape and may include at least one handle rotation control protrusion formed at a distal end thereof. Each of the housing couplers may include a receiving hole for rotatably receiving each of the cylindrical protrusions inserted therein and a plurality of angle adjustment grooves formed on the bottom of the receiving hole in a sector shape so that the handle rotation control protrusion is inserted into each of the angle adjustment grooves. At least one of the angle adjustment grooves may be formed to be larger than the handle rotation control protrusion so that the handle is swingable at a stop position. By forming the handle so as to swing at a predetermined position, it is possible to easily mount the holder on the holder receiving support.

Furthermore, the housing may be configured to rotate while being intermittently locked with respect to the base. In order to allow the housing of the holder to rotate being intermittently locked, a sliding guide formed at a central portion of the housing. A rotation angle divider having a through hole formed at a central portion thereof is slidably inserted into the sliding guide of the housing. Concave and convex portions are formed on an upper surface of the rotation angle divider at regular intervals along a circumferential direction. Furthermore, a spring is inserted into the sliding guide of the housing so as to elastically support the rotation angle divider. In addition, a screw is fastened to the sliding guide of the housing to prevent separation of the spring. The base has a through hole formed in a central portion thereof and includes an engaging portion protruding in a radial direction from an inner peripheral surface of the through hole. The engaging portion is disposed between the housing and the rotation angle divider. Furthermore, the engaging portion of the base is provided concave and convex portions formed along a circumferential direction so as to engage with the concave and convex portions of the rotation angle divider. Thus, the housing is intermittently locked at a predetermined angle when the housing rotates with respect to the base.

According to one aspect of the present invention, there is provided a holder receiving support capable of easily attaching and detaching a portable device holder. The holder receiving support includes a body having a depression portion for receiving a housing of a holder and an elastic hook protruding backward from the depression portion so that the handle is caught by the elastic hook in a state in which the housing of the holder is received in the depression portion and the handle is rotated backward. The elastic hook may include an elastic arm extending from the body, a locking protrusion protruding from the elastic arm, and a limiting protrusion protruding from the body toward the elastic arm to limit elastic deformation of the elastic arm.

The holder according to the present invention may be used in a state in which the holder is attached to a portable electronic device. The handle is rotatably connected to a housing and may rotate while being intermittently locked to the housing. Therefore, when the user fits a finger to the handle and when the user grasps and uses a portable electronic device, it is possible for the user to freely change a use position. In addition, the handle is locked by elasticity at a rotated or pivoted position so that the use position can be stably maintained.

The holder receiving support for receiving and supporting the holder according to the present invention is used together with the holder. The holder receiving support is a structure capable of firmly supporting the holder and can be fixed to the end of a joint such as a cradle or the like. When the holder and the holder receiving support are fixed to the holder receiving support, it is possible to mount and ultrasound echo signal various portable electronic devices.

DETAILED DESCRIPTION

Other objects, specific advantages and novel features of the present invention will become more apparent from the following detailed description of preferred embodiments given in conjunction with the accompanying drawings.

Figure 3:
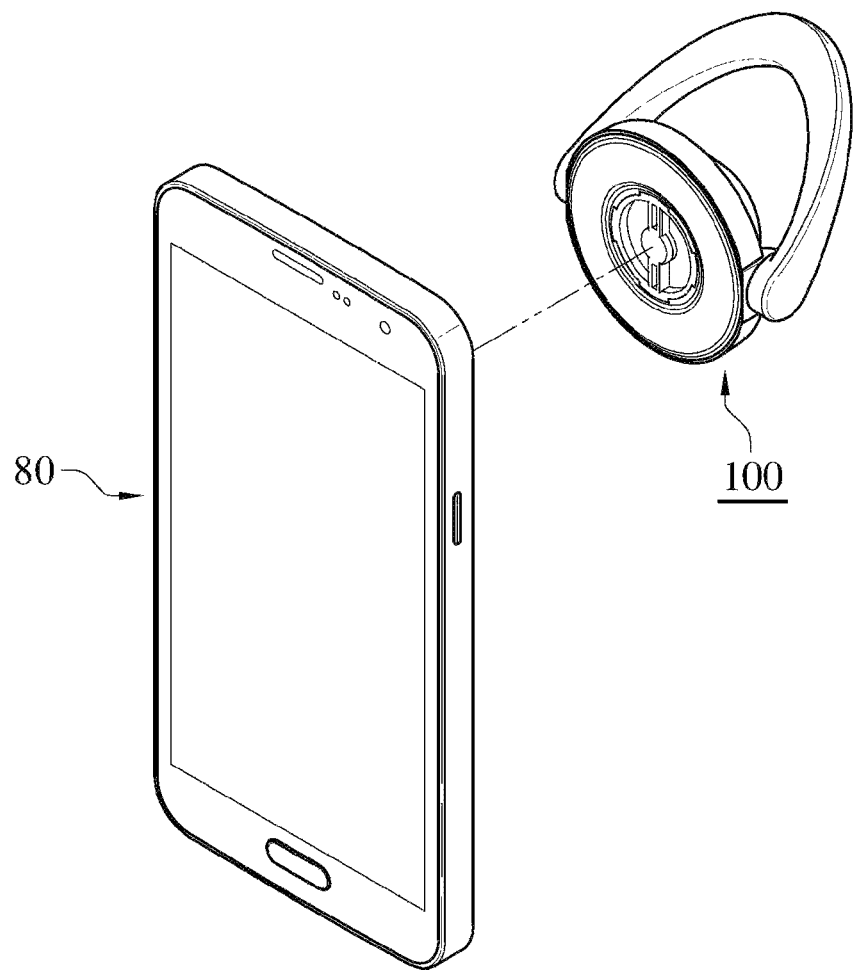
FIG. 3 is a perspective view of a holder according to an embodiment of the present invention and a mobile phone.
Figure 4:
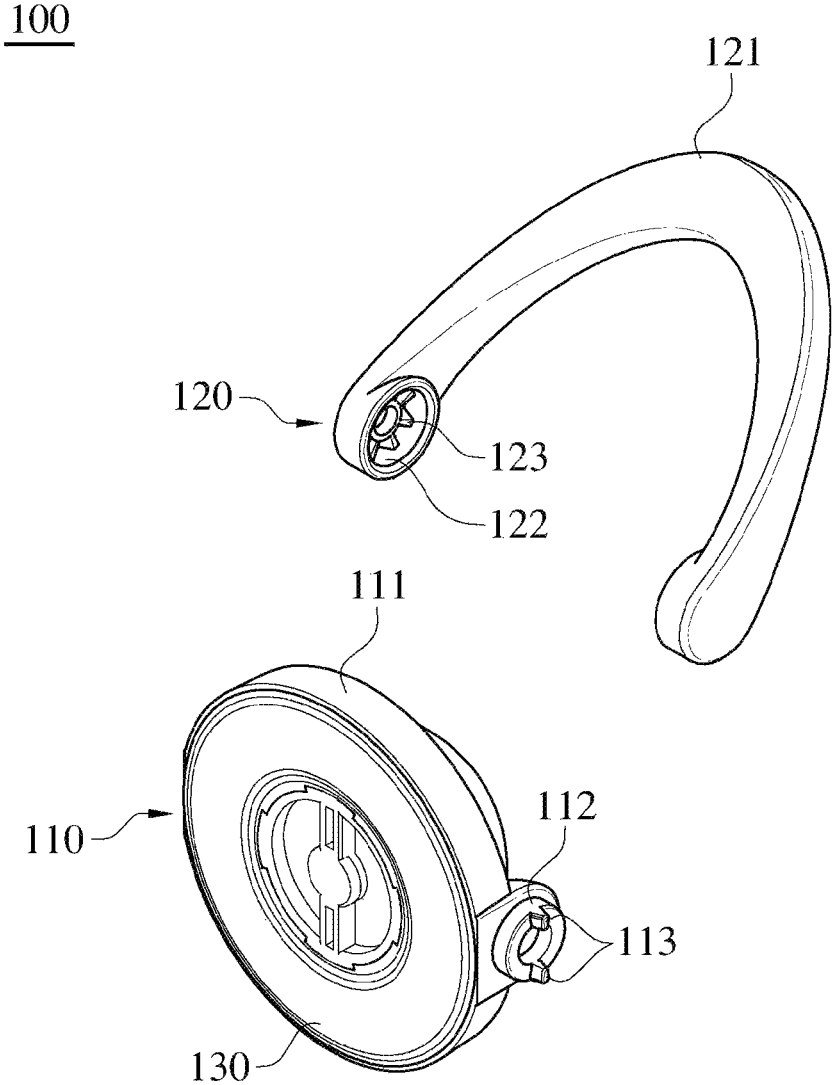
FIG. 4 is an exploded perspective view of the holder according to the present invention.

FIG. 3 is a holder 100 according to an embodiment of the present invention, which is to be attached a mobile phone 80. FIG. 4 is an exploded perspective view of the holder according to the present invention.

As shown in FIG. 4, the holder 100 of the present embodiment includes a fixed rotation unit 110 and a handle 120 rotatably mounted on a housing 111 of the fixed rotation unit 110. The fixed rotation unit 110 includes a circular housing 111, and the handle 120 is rotatably installed on both sides of the housing 111. The housing 111 and the handle 120 are connected by a rotary connector 112, 113, 122 and 123. The rotary connector 112, 113, 122 and 123 is constituted by a handle end connector 112 and 113 formed on both sides of the housing 111 and a housing coupler 122 and 123 formed at the ends of the handle 120. The handle end connector 112 and 113 includes a pair of cylindrical protrusions 112 protruding from both sides of the housing 111 in a direction perpendicular to the rotation axis of the housing 111 and at least one handle rotation control protrusion 113 protruding from the end of each of the cylindrical protrusions 112. The housing coupler 122 and 123 includes a receiving hole 122 for receiving the cylindrical protrusion 112 so that the cylindrical protrusion 112 can be inserted and rotated, and a plurality of angle adjustment grooves 123 formed on the bottom of the receiving hole 122 in a sector shape so that the rotation control protrusion 113 can be inserted.

Figure 13:
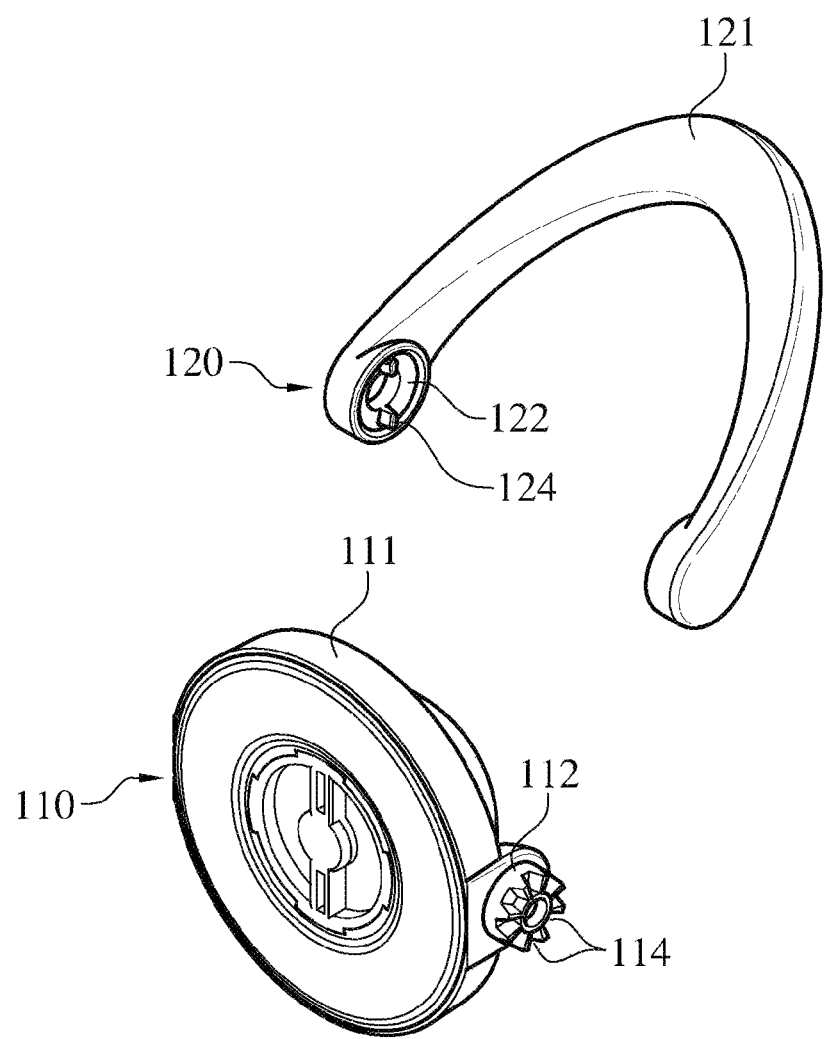
FIG. 13 is an exploded perspective view of a holder according to another embodiment of the present invention.

FIG. 13 shows a rotary connector 112, 114, 122 and 124 for connecting the housing 111 and the handle 120 according to another embodiment of the present invention. The rotary connector 112, 114, 122 and 124 includes a handle end connector 112 and 114, and a housing coupler 122 and 124. As shown in FIG. 13, the handle end connector 112 and 114 includes a pair of cylindrical protrusions 112 protruding from both sides of the housing 111 in a direction perpendicular to the rotation axis of the housing 111, and a plurality of angle adjustment grooves 114 formed in a sector shape at the end of each of cylindrical protrusion 112. The housing coupler 122 and 124 includes a receiving hole 122 for receiving the cylindrical protrusion 112 so that the cylindrical protrusion 112 can be inserted and rotated, and at least one handle rotation control protrusion 124 protruding from the bottom of the receiving hole 122. The handle rotation control protrusion 124 is inserted into the angle adjustment grooves 114 to provide a function of controlling the rotation angle so that the handle 120 rotates and stops at a predetermined angle when rotating the handle 120.

The handle 120 is manufactured by injection molding a synthetic resin. The handle 120 has elasticity and may spread apart to some extent. In order to couple the handle 120 and the fixed rotation unit 110, the handle 120 is spread apart and the cylindrical protrusion 112 of the housing is inserted into the receiving hole 122 of the handle 120. The handle rotation control protrusion 113 formed at the end of the cylindrical protrusion 112 is inserted into the angle adjustment groove 123 to lock the rotation of the handle 120 at a predetermined position.

Figure 5:
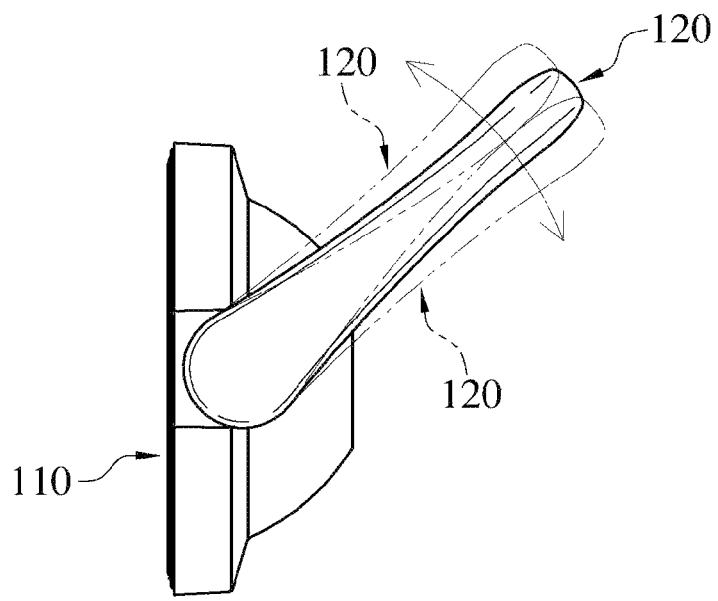
FIG. 5 is an explanatory view showing a use state of the holder shown in FIG. 4.
Figure 6:
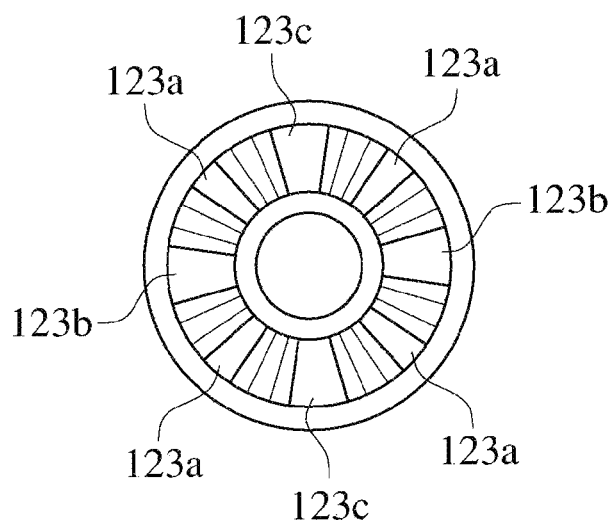
FIG. 6 is an explanatory view showing a housing coupling means of a holder handle.
Figure 7:
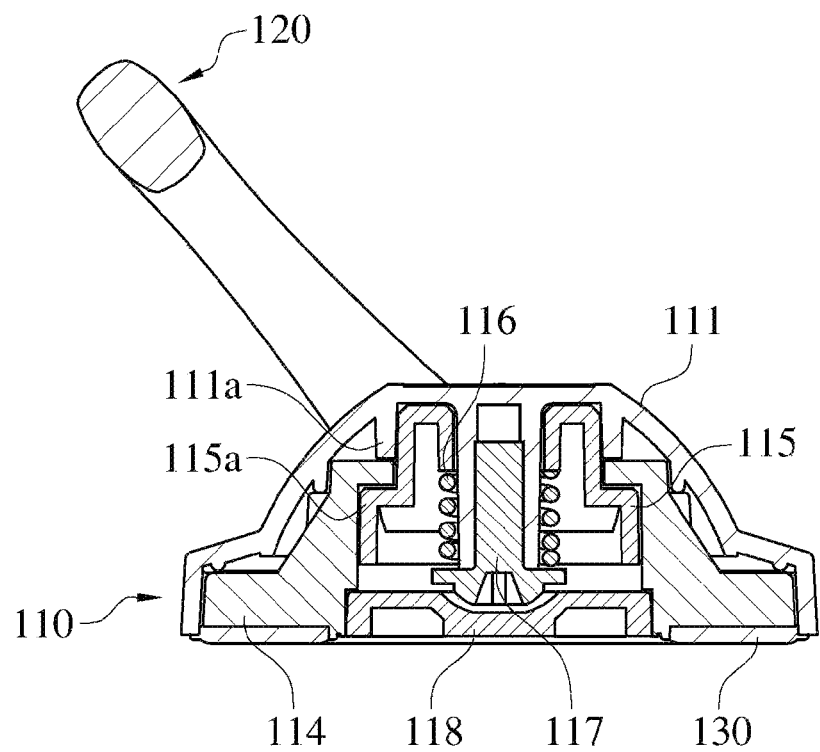
FIG. 7 is a sectional view of the holder shown in FIG. 4.
Figure 8:
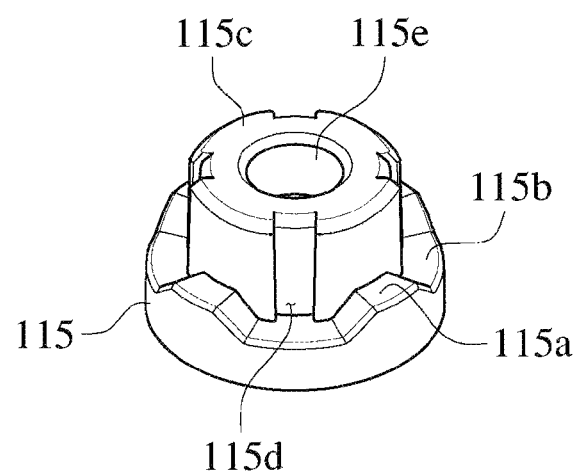
FIG. 8 is a perspective view of a rotation angle divider.
Figure 9:
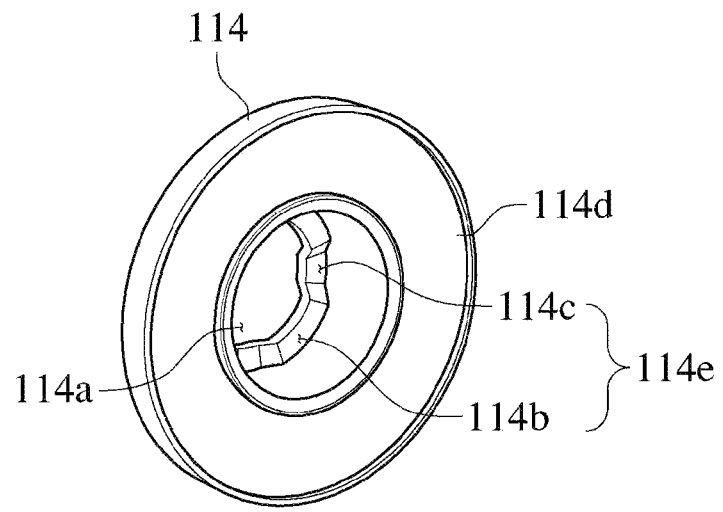
FIG. 9 is a perspective view of a base.
Figure 10:
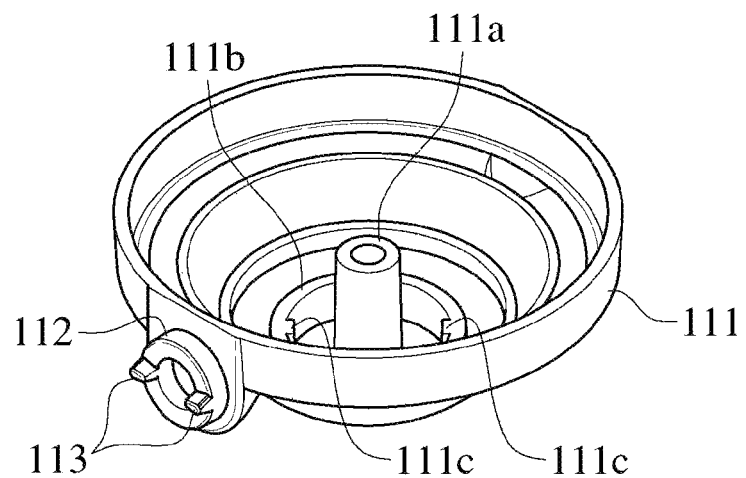
FIG. 10 is a perspective view of a housing.

Referring to FIGS. 5 and 6, when the handle 120 is rotated relative to the fixed rotation unit 110 while the handle rotation control protrusion 113 is inserted into the angle adjustment groove 123a, the handle 120 is spread apart and the handle rotation control protrusion 113 is removed from the angle adjustment groove 123a and moved into the adjacent angle adjustment groove 123b. The handle 120 keeps the locked state by preventing the angle adjustment groove 123b from being removed from the handle rotation control protrusion 113 by elasticity. As shown in FIG. 5, the holder 100 of the present embodiment is configured so that the handle 120 can be swing in a locked position. The size of the angle adjustment grooves 123a, 123b and 123c may be differently set as shown in FIG. 6 so that the handle 120 can swing at a specific locked position. In the illustrated embodiment, the size of the angle adjustment groove 123b set to be larger than that of the angle adjustment grooves 123a and 123c. That is, the angle adjustment groove 123b is formed to be larger than the rotation control protrusion 113. Accordingly, when the handle 120 is locked in the angle adjustment groove 123b, the handle 120 can swing to some extent.

Figure 12:
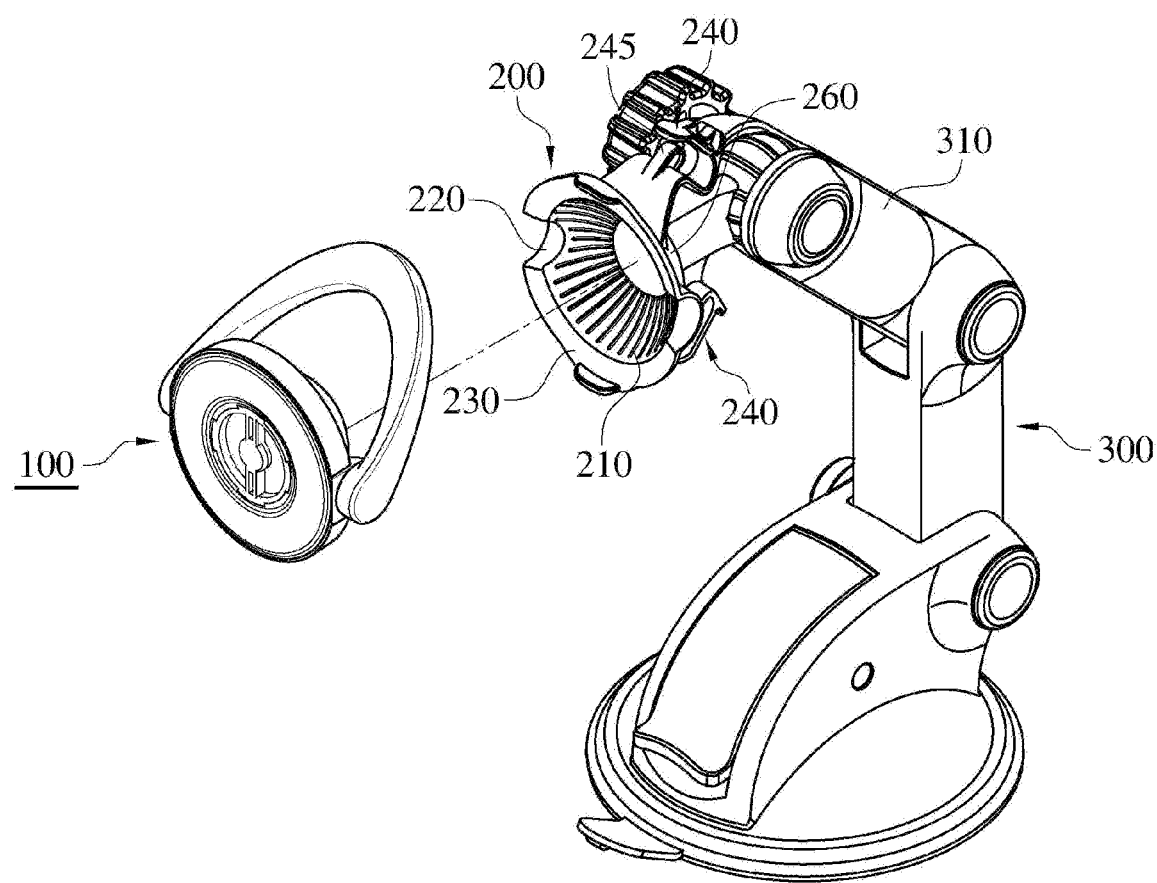
FIG. 12 is an exploded perspective view of the embodiment shown in FIG. 11.

The reason why the handle 120 locked at the position shown in FIG. 5 is made swingable is that when the holder 100 is mounted on the cradle as shown in FIG. 12, the handle 120 is given a swing angle to facilitate the mounting of the holder 100. If the handle 120 has no swing angle, the handle 120 and the holder receiving support 200 may interfere with each other when mounting the holder 100. In this case, the handle 120 is maintained at the locked position, whereby the mounting of the holder 100 becomes onerous due to the repulsive force of the handle 120. When the handle 120 has a swing angle, the repulsive force of the handle 120 is not large even if the handle 120 interferes with the holder receiving support 200. Therefore, it is possible to easily mount the handle 120.

Referring to FIGS. 7 to 10, the fixed rotation unit 110 includes a base 114 for fixing a portable device, and a housing 111 rotatably mounted on the base 114. The housing 111 is configured to be rotated while being intermittently locked with respect to the base 114. In order to allow the housing 111 to rotate while being intermittently locked with respect to the base 114, a sliding guide 111a is formed at the center of the housing 111, and a rotation angle divider 115 having a through hole 115e at the center thereof a sliding guide 111a is slidably inserted into the sliding guide 111a. On the upper surface of the rotation angle divider 115, concave and convex portions 115a and 115b are formed at regular intervals along the circumferential direction. Furthermore, a spring 116 is inserted into the sliding guide 111a of the housing 111 to elastically support the rotation angle divider 115. In addition, a screw 117 is fastened to the sliding guide 111a so that the spring 116 is not separated.

The base 114 has a through hole 114a formed at the center thereof and includes an engaging portion 114e protruding in the radial direction from the inner peripheral surface of the through hole 114a. The engaging portion 114e of the base 114 is disposed between the housing 111 and the rotation angle divider 115. The engaging portion 114e of the base 114 is provided with concave and convex portions 114b and 114c along the circumferential direction so as to engage with the concave and convex portions 115a and 115b of the rotation angle divider 115. Therefore, when the housing 111 rotates with respect to the base 114, the housing 111 is caused to rotate while being intermittently locked at a predetermined angle. The locking of the housing 111 is maintained by the elasticity of the spring 116. A sliding guide 115d is formed in the rotation angle divider 115. The sliding guide 115d is engaged with and coupled to a sliding protrusion 111c formed on the inner peripheral surface of a support wall 111b inside the housing 111. Therefore, when the housing 111 rotates, the rotation angle divider 115 may move up and down with respect to the sliding guide 111a while rotating integrally with the housing 111. When the rotation angle divider 115 rotates, the concave and convex portions 114b and 114c of the base 114 are alternately engaged with and intermittently locked to the concave and convex portions 115a and 115b of the rotation angle divider 115.

Figure 1:
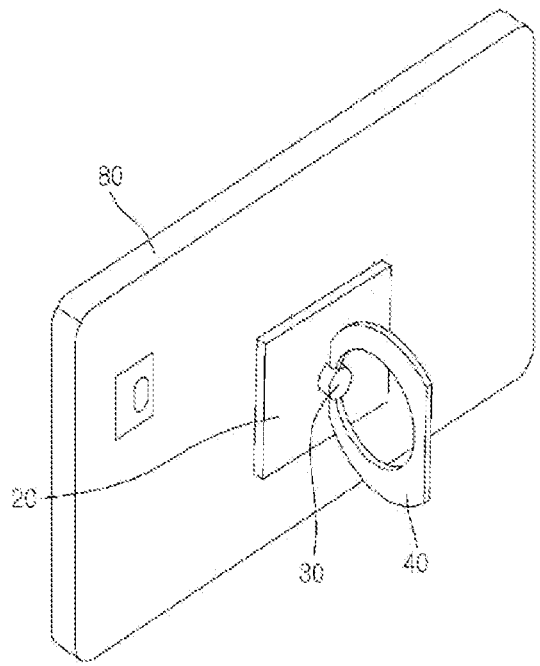
FIG. 1 is a schematic view showing a conventional holder (hanger grip).
Figure 2:
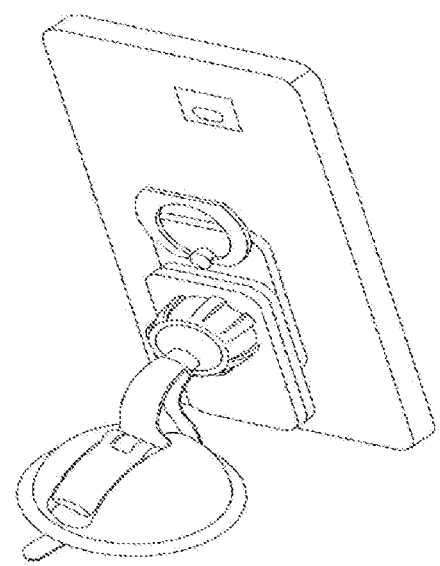
FIG. 2 is a view showing a state in which the holder (hanger grip) shown in FIG. 1 is attached to a cradle.

In the holder 100 of the present embodiment, a gel pad 130 is attached to one side of the base 114. When the holder 100 is used as shown in FIG. 1, the base 111 is fixed to a case of a portable electronic device using the gel pad 130. If necessary, a suction plate may be attached instead of the gel pad 130, or the base 114 may be integrally formed with a case (mobile phone case) for mounting a portable electronic device.

Figure 11:
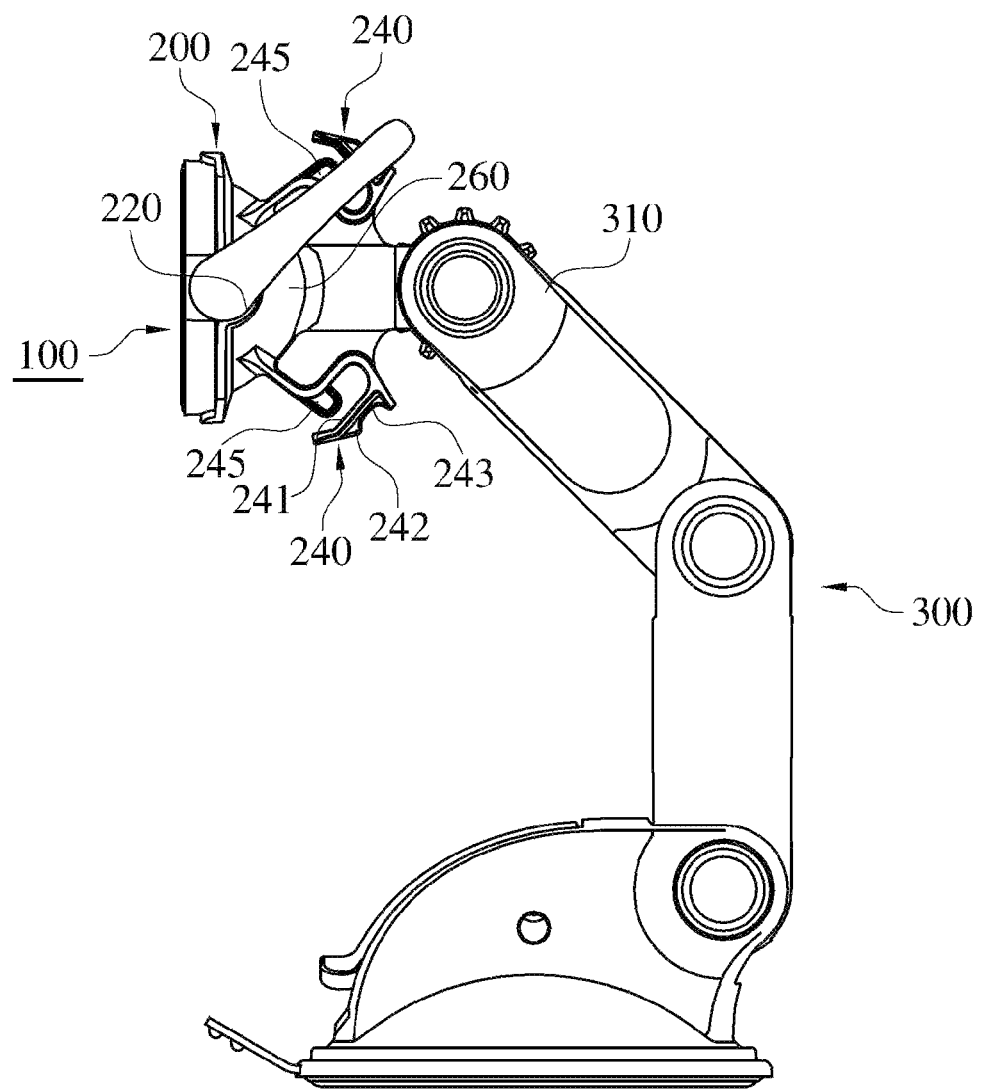
FIG. 11 is an explanatory view showing a state in which the holder and the holder receiving support are installed in a cradle.

The holder receiving support 200 will be described with reference to FIGS. 11 and 12. The holder receiving support 200 of the present embodiment is rotatably fixed to a joint end 310 of a cradle 300. The holder receiving support 200 includes a body 260 having a depression portion 210 for receiving the housing 111 of the holder 100. The body 260 includes an elastic hook 240 for fixing the holder 100 by catching the handle 120 of the holder 100. The elastic hook 240 protrudes from the back side of the depression portion 210 of the body 260. A contact support portion 230 for making contact with the body of the holder 100 is formed around the depression portion 210. A handle receiving groove 220 for receiving the handle 120 is formed in the contact support portion 230.

The elastic hook 240 includes an elastic arm 241 extending from the body 260, a locking protrusion 242 protruding from the elastic arm 241 and a locking groove 243 formed on the back side of the locking protrusion 242. The elastic hook 240 further includes a limiting protrusion 245 protruding from the body 260 toward the elastic arm 241 so as to limit the elastic deformation of the elastic arm 241. The elastic hook 240 is elastically deformed in contact with the inside of the handle 120 to apply an elastic force to the handle 120 to prevent the holder 100 from being detached from the depression portion 210. When the handle 120 is pushed downward in a state in which the housing 120 of the holder 100 is received in the depression portion 210 of the body 260, the handle 120 is rotated. The rotating handle 120 rides over the locking protrusion 242 while elastically deforming the elastic arm 241 and is seated in the locking groove 243. In the case of removing the holder 100 from the holder receiving support 200, the handle 120 is rotated in the opposite direction to deform the elastic arm 241 so that the handle 120 rides over the locking protrusion 242 and is separated from the elastic hook 240.

While the present invention has been described in connection with what is presently considered to be practical exemplary embodiments, it is to be understood that the invention is not limited to the embodiments described above. It will be understood by those skilled in the art that various changes, modifications, or substitutions may be made by those skilled in the art without departing from the spirit and scope of the invention.

What is claimed is:

1. A portable device holder, comprising:
   a base to be fixed to a portable device;
   a housing rotatably mounted on the base; and
   an elastic handle rotatably fixed to both side surfaces of the housing and configured to be elastically locked at a predetermined rotation position,
   wherein handle end connectors are disposed on the both side surfaces of the housing so as to protrude in a direction perpendicular to a rotation axis of the housing, and
   housing couplers rotatably coupled to the handle end connectors are disposed at both ends of the elastic handle,
   wherein the housing has a sliding guide disposed at a central portion thereof,
   the housing includes a rotation angle divider having a through hole disposed at a central portion thereof so that the rotation angle divider is slidably inserted into the sliding guide and having concave and convex portions formed on an upper surface of the rotation angle divider at regular intervals along a circumferential direction, a spring inserted into the sliding guide of the housing, and a screw fastened to the sliding guide of the housing to prevent separation of the spring,
   the base has a through hole disposed in a central portion thereof and an engaging portion protruding in a radial direction from an inner peripheral surface of the through hole so as to be disposed between the housing and the rotation angle divider, and the engaging portion of the base includes concave and convex portions formed along a circumferential direction so as to engage with the concave and convex portions of the rotation angle divider so that the housing is intermittently locked at a predetermined angle when the housing rotates with respect to the base.

2. The portable device holder of claim 1, wherein each of the handle end connectors includes a pair of cylindrical protrusions protruding from the both side surfaces of the housing in the direction perpendicular to the rotation axis of the housing and at least one handle rotation control protrusion protruding from a distal end of each of the pair of cylindrical protrusions, and each of the housing couplers includes a receiving hole for rotatably receiving each of the pair of cylindrical protrusions inserted therein and a plurality of angle adjustment grooves disposed on a bottom of the receiving hole in a sector shape so that the at least one handle rotation control protrusion is inserted into each of the plurality of angle adjustment grooves.

3. The portable device holder of claim 1, wherein each of the handle end connectors includes a pair of cylindrical protrusions protruding from the both side surfaces of the housing in the direction perpendicular to the rotation axis of the housing and a plurality of angle adjustment grooves disposed in distal ends of the cylindrical protrusions in a sector shape, and each of the housing couplers includes a receiving hole for rotatably receiving each of the pair of cylindrical protrusions inserted therein and at least one handle rotation control protrusion protruding from a bottom of the receiving hole.

4. The portable device holder of claim 2, wherein at least one of the plurality of angle adjustment grooves is larger than the at least one handle rotation control protrusion so that the handle is swingable at a stop position.

5. A holder receiving support, comprising:
a body including a depression portion for receiving a housing of a portable device holder, the portable device holder having a base having a gel pad attached to one surface thereof, a housing rotatably mounted on the base, and an elastic handle rotatably fixed to both side surfaces of the housing and configured to be elastically locked at a predetermined rotation position, the housing including handle end connectors formed on the both side surfaces of the housing so as to protrude in a direction perpendicular to a rotation axis of the housing, the elastic handle including housing couplers formed at both ends of the elastic handle rotatably coupled to the handle end connectors; and an elastic hook protruding backward from the depression portion so that the handle is caught by the elastic hook when the housing of the portable device holder is received in the depression portion and the handle is rotated backward, wherein the housing has a sliding guide disposed at a central portion thereof, the housing includes a rotation angle divider having a through hole disposed at a central portion thereof so that the rotation angle divider is slidably inserted into the sliding guide and having concave and convex portions formed on an upper surface of the rotation angle divider at regular intervals along a circumferential direction, a spring inserted into the sliding guide of the housing, and a screw fastened to the sliding guide of the housing to prevent separation of the spring, the base has a through hole disposed in a central portion thereof and an engaging portion protruding in a radial direction from an inner peripheral surface of the through hole so as to be disposed between the housing and the rotation angle divider, and the engaging portion of the base includes concave and convex portions formed along a circumferential direction so as to engage with the concave and convex portions of the rotation angle divider so that the housing is intermittently locked at a predetermined angle when the housing rotates with respect to the base.

6. The holder receiving support of claim 5, wherein the elastic hook includes an elastic arm extending from the body, a locking protrusion protruding from the elastic arm, and a limiting protrusion protruding from the body toward the elastic arm to limit elastic deformation of the elastic arm.

\* \* \* \* \*